United States Patent [19]

Kinberger

[11] Patent Number: 5,159,177
[45] Date of Patent: Oct. 27, 1992

[54] CONTAINER FOR TRANSPORTING HOT READY-TO-EAT MEALS AND KEEPING THEM HOT

[76] Inventor: Alois Kinberger, Müncher Str. 65a, 8035 Gauting, Fed. Rep. of Germany

[21] Appl. No.: 736,368

[22] Filed: Jul. 26, 1991

[30] Foreign Application Priority Data

Aug. 14, 1990 [DE] Fed. Rep. of Germany ....... 4025762

[51] Int. Cl.⁵ .............................................. F24C 7/06
[52] U.S. Cl. ..................................... 219/386; 219/521
[58] Field of Search ............... 219/385, 386, 387, 521; 126/193, 198

[56] References Cited

U.S. PATENT DOCUMENTS

| 1,377,092 | 5/1921 | Phaneuf | 219/387 |
|---|---|---|---|
| 2,486,178 | 10/1949 | Kuehlhorn | |
| 2,739,584 | 3/1956 | Hupp | 126/198 |
| 3,038,986 | 6/1962 | Molitor | 219/387 |
| 3,051,582 | 8/1962 | Muckler | 219/386 |
| 3,358,674 | 12/1967 | Chisholm | 126/193 |
| 3,855,994 | 12/1974 | Evans | 126/198 |
| 4,113,439 | 9/1978 | Ookubo | 126/193 |
| 4,163,444 | 8/1979 | Drouin | 126/198 |
| 4,806,736 | 2/1989 | Schirico | |
| 4,830,190 | 5/1989 | Inagaki | |
| 4,883,195 | 11/1989 | Ott et al. | |

FOREIGN PATENT DOCUMENTS

| 413605 | 2/1991 | European Pat. Off. |
| 1932142 | 6/1971 | Fed. Rep. of Germany |
| 2359097 | 6/1974 | Fed. Rep. of Germany |
| 3234620 | 3/1984 | Fed. Rep. of Germany |

Primary Examiner—Teresa J. Walberg
Attorney, Agent, or Firm—Sughrue, Mion, Zinn, Macpeak & Seas

[57] ABSTRACT

A container for transporting hot ready-to-eat meals and for keeping them hot is of a box-like configuration having heat-insulating walls, with an access door of non-insulating nature. Formed at the lower edge of the door is an access opening for ambient air, while an outlet opening for air to issue from the container is formed at the upper edge of the door. The flow of air into the access opening, through the interior of the container and out of the outlet opening, entrains moisture given off by the ready-to-eat meals in the container, the moisture condensing out on the door.

14 Claims, 1 Drawing Sheet

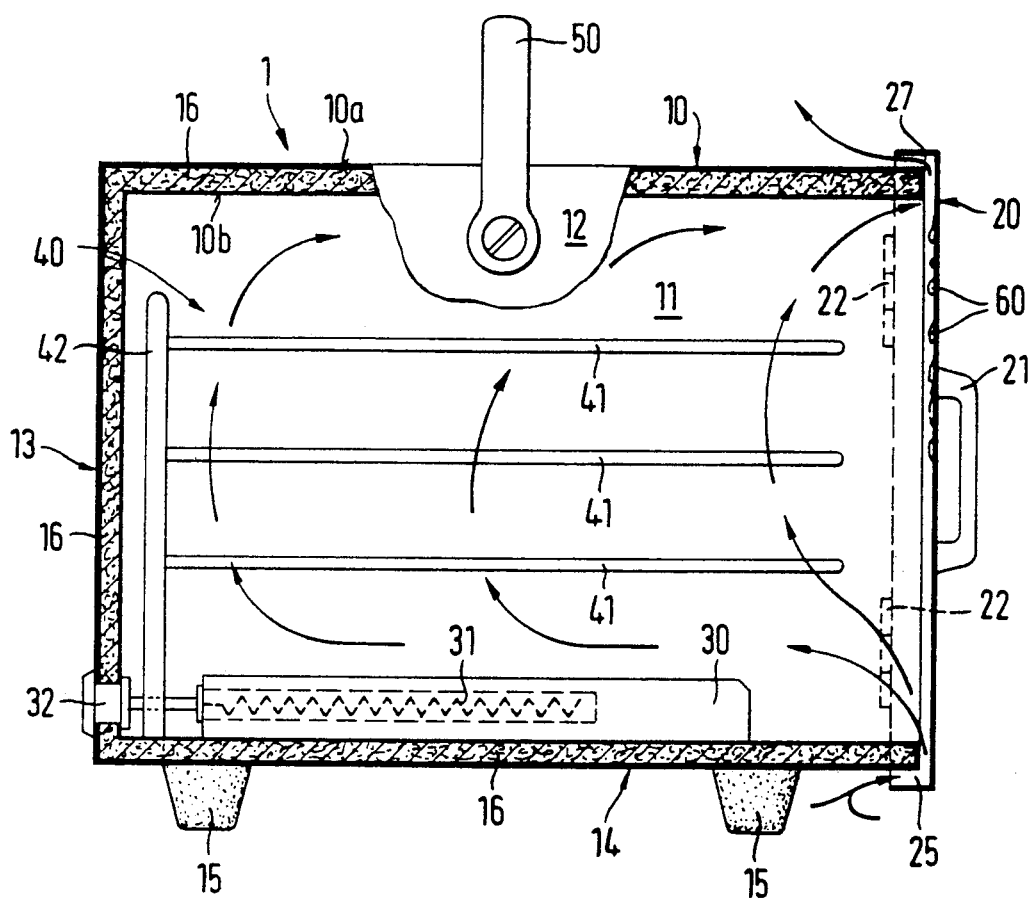

CONTAINER FOR TRANSPORTING HOT READY-TO-EAT MEALS AND KEEPING THEM HOT

BACKGROUND OF THE INVENTION

There are a number of situations which involve a need for hot ready-to-eat meals to be kept hot, for example for transportation purposes. To achieve that aim, it is possible to use a container of a heat-insulating nature. Such a container may typically be used for example by pizza baking establishments which produce pizzas in response to orders over the telephone, and then deliver the pizzas to the home of the customer.

In that situation, in the pizza baking establishment, the pizzas in the fully baked condition are removed from the respective baking tray and generally individually put into heat-insulating containers of cardboard, in which they are transported to and handed over to the customer. Containers of that kind for transporting pizzas and keeping them hot have been found to be comparatively expensive in practice as in fact they are only used once and in addition they have been found to be environmentally polluting as they must be disposed of, as waste. In addition there is the problem that a moisture-saturated atmosphere is formed in the interior of the closed cardboard container, emanating from the hot moisture-containing pizza, and that atmosphere softens the dough base of the pizza, which customers want to be crisp and crunchy, so that the enjoyment value is impaired.

SUMMARY OF THE INVENTION

An object of the invention is to provide a container for keeping hot ready-to-eat meals which avoids an adverse effect in terms of taste and enjoyment on the ready-to-eat meals which are transported and kept hot therein, due to steam escaping from the meals.

Another object of the invention is to provide a container for transporting hot ready-to-eat meals and keeping them hot, which can accommodate a plurality of meals at the same time.

A further object of the invention is a container for holding ready-to-eat meals, while keeping them hot, which is re-usable and thus more environmentally friendly.

In accordance with the invention, the container for keeping ready-to-eat meals hot, for example for transporting same, comprises walls defining the container, a part of a wall of the container comprising a material which is a good conductor of heat. Provided in the region of a lower side edge of the container is an access opening for ambient air while provided in the region of an upper side edge of the container is an outlet opening for air to issue from the interior of the container.

That configuration according to the invention provides that cold dry ambient air can be drawn through the lower access opening into the interior of the container which contains for example one or more pizzas, flows in the interior of the container over the hot, water vapour-emanating pizza, picks up moisture therefrom, entrains it, and finally escapes to the ambient atmosphere through the upper outlet opening of the container. On its way towards the outlet opening, the moisture-saturated air encounters said part of the side wall of the container, which comprises a material that is a good conductor of heat; by virtue of the heat conduction effect thereof that part of the side wall is kept at least substantially at ambient temperature so that it acts as a condensate trap for the moisture-saturated air which flows therepast, at least a substantial part of the moisture entrained in the air being deposited as condensate on that part of the side wall of the container. When there is a sufficient amount of condensate, it can be removed downwardly from the outlet opening.

That arrangement prevents a moisture-saturated atmosphere from being formed in the interior of the container although the moist pizza which is to be kept hot is continuously giving off moisture. That therefore ensures that the crispy base of the pizza remains crispy and crunchy until the customer receives it, even over a prolonged period for which the pizza has to be kept hot, and therefore the taste of the pizza and the enjoyment value thereof are not adversely affected.

There is also the advantage that the container according to the invention can be re-used many times so that its costs can be kept low and it does not constitute environmentally polluting waste. A further advantage is the point that the container according to the invention can be designed to accommodate a plurality of similar or different ready-to-eat meals, for example for transporting three pizzas.

A preferred feature of the invention provides that the side wall of the container, which is disposed between the access opening and the outlet opening, is in the form of a door made from metal sheet, and a gap is formed between the lower edge of the door and the adjacent lower wall of the container to form the access opening and a gap is formed between the upper edge of the door and the adjacent upper wall of the container to form the outlet opening, when the door is in the closed position. That design configuration affords a large flow cross-section at the access and outlet openings, without the closed shape of the container generally being adversely affected by gaping openings. It is also advantageous in that respect that, in order to provide the access opening and the outlet opening, the access door of the container, which is required in any case, is simply designed to provide a corresponding spacing relative to the respective portions of the door opening to be closed by the door, so that there is no need for additional measures, but rather the production tolerances which always occur in any case are specifically utilised to from the openings.

In another preferred feature the heat-barrier walls of the container are formed as a double-wall structure from metal sheet with an intermediate layer of an insulating, heat-barrier material. The double-wall configuration provides, on both sides of the heat-barrier walls, smooth surfaces which can be washed off and which can thus be hygienically kept clean, as are always desirable for dealing with foodstuffs. At the same time, the double-wall configuration with the intermediate layer consisting of the heat-barrier material provides a very good heat-barrier effect.

Preferably, the metal sheet of the door and the metal sheet of the heat-barrier walls comprise aluminum or an aluminum alloy. That choice of material means that the walls have a surface which is easy to keep clean while in addition, because of the good heat-conducting properties of aluminum, that material affords a good cooling action on the part of the door, which is required for the moisture to be effectively deposited in the form of condensate.

In another preferred feature a block of a heat-storage material, such as metal, may be arranged on the inward side of the bottom wall of the container. The block may be heated up in a suitable manner prior to use, that is to say before the dishes to be kept hot are put into the container, so that in addition to the insulating effect of the container, which is present in any case, the stored heat guarantees that the dishes of food are kept hot in a particular effective manner.

In that arrangement it may advantageously be provided that the block has an electrical heating element, so that is possible for the block to be raised to the desired temperature before the pizzas are put into the container, without becoming dirty or contaminated, while the use of an electrical heating element permits particularly accurate monitoring of the temperature by means of a thermometer or by predetermining the period of time for which the block is heated.

Further objects, features and advantages of the invention will be apparent from the following description of a preferred embodiment.

BRIEF DESCRIPTION OF THE DRAWING

The single FIGURE of the accompanying drawing is a vertical partial section of a container for transporting pizzas and keeping them hot.

DESCRIPTION OF THE PREFERRED EMBODIMENT

As shown in the drawing, a container for transporting hot ready-to-eat meals and keeping them hot, which is generally identified by reference numeral 1, is constructed in the manner of a rectangular box comprising side walls 11 and 12, a rear side wall 13, a top wall 10, a bottom wall 14 and an access door 20. Mounted to the underside of the bottom wall 14 are a plurality of support feet 15 which are for example in the form of rubber buffer members in order to prevent damage to a surface on which the container is put down.

The walls 10 through 14 are fixedly joined together without any gaps therebetween. As shown in the drawing, the top wall 10 comprises sheet panels 10a and 10b which are arranged at a spacing from each other and which comprise for example aluminum or an aluminum alloy, with a heat-barrier material 16 being disposed as a layer therebetween. The heat-barrier material 16 may be for example a plastics foam, such as foamed polystyrene or polyurethane foam, or a mineral fiber wool. The walls 11, 12, 13 and 14 are of a similar double-wall structure. The part of the container 1 which is formed from the walls 10 through 14 is thus designed to regard to its nature specifically to provide a good heat barrier effect relative to the ambient atmosphere.

In order to facilitate transportation, a pivotable carrier loop handle 50 is attached to the container in the upper region of the side walls 11 and 12.

Disposed in the interior of the container 1 on the inward side of the bottom wall 14 is a block 30 of heat-storage material such as for example a metal, more particularly aluminum or copper. Disposed within the block 30 is an electrical heating element 31 which is connected by way of suitable lines to a plug socket 32 in the rear wall 13 of the container 1.

Also provided in the interior of the container 1 is a holding arrangement 40 for a plurality of pizzas, the holding arrangement 40 comprising a support frame member 42 which rests on the bottom wall 14, and support bars 41 which extend at least substantially horizontally away from the support frame member 42. The support bars 41 are arranged at horizontal and vertical spacings relative to each other in such a way that a pizza can be deposited on a respective pair of the support bars 41.

As shown in the drawing, the door 20 is connected to the side wall 11 by means of hinges 22 pivotably about a vertical axis in such a way that in the condition in which the door is pivoted open, a pizza can be unimpededly introduced into or removed from the container. A door handle 21 is provided on the outside of the door 20 to make it easier to operate the door.

Unlike the walls 10 through 14, the door 20 is not of a heat-insulating nature. It comprises a metal sheet panel, preferably of aluminum, and is so formed that its upper and lower horizontal edge portions are each bent over at a right angle towards the container 1, wherein respective gaps remain between the bent-over edge portions and the associated edges of the top wall 20 and the bottom wall 14. The lower gap between the door 20 and the bottom wall 14 forms an access opening 25 for ambient air to flow into the container while the upper gap between the to wall 10 of the container 1 and the door 20 serves as an outlet opening 26 for air to issue from the interior of the container. The vertical side edges of the door 20 each closely adjoin the respective adjacent edges of the side walls 11 and 12 of the container 1.

In use of the container 1, the heating element 31 is firstly connected by way of the plug socket 32 to a suitable power source and heated up until the block 30 has reached the desired temperature. The desired temperature can be monitored by a thermometer mounted at the rear side of the rear wall 13 of the container 1, or it can quite simply be determined by the heating operation being restricted to a given period of time.

Fully baked and hot pizzas, or other hot meals, are introduced into the container 1 which has now been preheated. The pizzas on their baking trays or baking cases are preferably deposited on the support bars 41 of the holding arrangement 40.

During transportation, the pizzas are kept hot in the container by the heat-storage block 30 replacing any thermal energy which is lost by virtue of losses to the environment.

A significant consideration during that phase of use is that ambient air can be drawn in from below through the access opening 25 at the door, then flows along the arrows shown in the drawing through the interior of the container 1 and in so doing picks up moisture which is given off by the pizza or pizzas. The moisture-saturated air then escapes upwardly and to the ambient atmosphere through the outlet opening 27. As it flows along that path, the moisture-bearing air flows along the door 20 which is not heat-insulating and which is thus in the form of a cooling surface so that the moisture entrained in the air condenses out at the inward surface of the door, more especially in the upper region thereof, as shown by the drops of condensate indicated at 60 in the drawing. The drops of condensate 60 can run downwardly along the inward surface of the door 20 and escape through the access opening 25. That prevents the moisture which issues from the hot pizza, in particular from the topping on the top side thereof, from resulting in the dough base of the pizza, which is wanted to be crisp and crunchy, becoming softened by that moisture.

After transportation the pizzas on their baking trays, with the door 20 in an open position, are pulled off the support bars 41 of the holding arrangement 40, and out of the container 1 to such an extent that the individual pizzas can be removed from the baking tray by means of a suitable pizza lifting implement such as a spatula and put down on a dish of the recipient or customer. So that the baking trays do not tip off the support bars when they are partly pulled out of the container, means such as permanent magnets may be disposed in the region of the support bars 41 which are towards the door opening, to hold fast the parts of the baking trays which remain on the support bars 41 so as to prevent the baking trays from tipping off.

It will be appreciated that the above-described embodiment has been set forth solely by way of example and illustration of the invention and that various other modifications and alterations may be made without thereby departing from the spirit and scope of the invention.

What is claimed is:

1. A container for keeping hot and transporting hot ready-to-eat meals, said meals having moisture-containing parts as well as parts which are supposed to remain crisp, wherein said container comprises walls which are of a heat-barrier nature and a side wall at least a part of which comprises material that is a good conductor of heat, and wherein an access opening, for ambient air in the region of a lower side edge of the container, and an outlet opening, in the region of an upper side edge of the container for air to issue from the interior of the container, are provided, so that there is generated a stream of moisture-saturated air which encounters said side wall part which acts as a condensate trap.

2. A container as set forth in claim 1 wherein the side wall which is between said access opening and said outlet opening is in the form of a door formed from metal sheet, said access opening is provided by a gap between the lower edge of the door and the adjacent bottom wall of the container, and said outlet opening is provided by a gap between the upper edge of the door and the adjacent upper wall of the container, when the door is in a closed position.

3. A container as set forth in claim 2 wherein the door comprises aluminum.

4. A container as set forth in claim 2 wherein the door comprises aluminum alloy.

5. A container as set forth in claim 1 wherein the heat-barrier walls of the container are of a double-walled form comprising metal sheet with an intermediate layer of an insulating heat-barrier material.

6. A container as set forth in claim 5 wherein the metal sheet of the heat-barrier walls comprises aluminum.

7. A container as set forth in claim 5 wherein the metal sheet of the heat-barrier walls comprises aluminum alloy.

8. A container as set forth in claim 1 and further including a block of heat-storage material on the inward side of the bottom wall of the container.

9. A container as set forth in claim 8 wherein said block is of metal.

10. A container as set forth in claim 8 wherein the block is provided with an electrical heating element.

11. A container for keeping hot and transporting hot ready-to-eat foods, said foods having moisture-containing parts as well as parts which are supposed to remain crisp, wherein said container comprises: first and second mutually opposite side walls, a top wall, a bottom wall, and a rear wall, said walls co-operating to define a box structure for accommodating at least one food receptacle, at least a substantial number of said walls having a heat-insulating effect; an access door mounted to said box structure and movable between an open position of allowing access to the interior of the box structure and a closed position of closing the box structure; an access opening for the intake of ambient air in a region of the box structure at least adjacent to the bottom wall; and an outlet opening for the for the issue of air from the box structure in a region thereof at least adjacent the top wall, wherein a limited part of the assembly of said box structure and said door comprises material that is a good conductor of heat, so that there is generated a stream of moisture-saturated air which encounters said limited part acting as a condensate trap.

12. A container as set forth in claim 11 wherein said access opening is defined between the bottom wall and the lower edge of said door.

13. A container as set forth in claim 11 wherein said outlet opening is defined between the top wall and the upper edge of said door.

14. A container as set forth in claim 11 wherein all of said walls have said heat-insulating effect, and wherein said limited part of said assembly is said door.

* * * * *